United States Patent [19]
Roof et al.

[11] 3,762,197
[45] Oct. 2, 1973

[54] ACOUSTICAL DETECTING APPARATUS

[75] Inventors: Lewis B. Roof; Harold M. Neer; Marvin C. Burk, all of Bartlesville, Okla.

[73] Assignee: Phillips Petroleum Company, Bartlesville, Okla.

[22] Filed: Sept. 14, 1970

[21] Appl. No.: 72,025

[52] U.S. Cl. ................................. 73/24, 73/67.6
[51] Int. Cl. ........................................ G01n 29/02
[58] Field of Search ................... 73/23.1, 24, 67.6; 324/83 A

[56] References Cited
UNITED STATES PATENTS

| | | | |
|---|---|---|---|
| 2,922,952 | 1/1960 | Povey et al. | 324/83 A |
| 2,930,895 | 3/1960 | Kuchne | 324/83 A X |
| 3,009,107 | 11/1961 | Aspden et al. | 324/83 A |
| 3,468,157 | 9/1969 | Burk et al. | 73/24 |
| 2,963,648 | 12/1960 | Baskin et al. | 324/83 A |
| 3,211,993 | 10/1965 | Golden et al. | 324/83 A |
| 3,465,264 | 9/1969 | Stone | 331/166 |
| 3,557,605 | 1/1971 | Lanneau et al. | 73/24 |

OTHER PUBLICATIONS

Noble et al., "Performance and Characteristics of An Ultrasonic Gas Chromatograph Effluent Detector," Analytical Chemistry, Volume 36, July 1964, pp. 1421–1427.

Primary Examiner—Richard C. Queisser
Assistant Examiner—Arthur E. Korkosz
Attorney—Young and Quigg

[57] ABSTRACT

Changes in composition of a fluid stream are detected by passing the stream through a chamber having an acoustical signal generator spaced from a detector. The generator is actuated by an oscillator. Signals from the oscillator and the detector are applied to the respective input terminals of a flip-flop circuit. A measurement of the D.C. component of the output signal from the flip-flop circuit provides an indication of changes in composition of the fluid stream.

3 Claims, 1 Drawing Figure

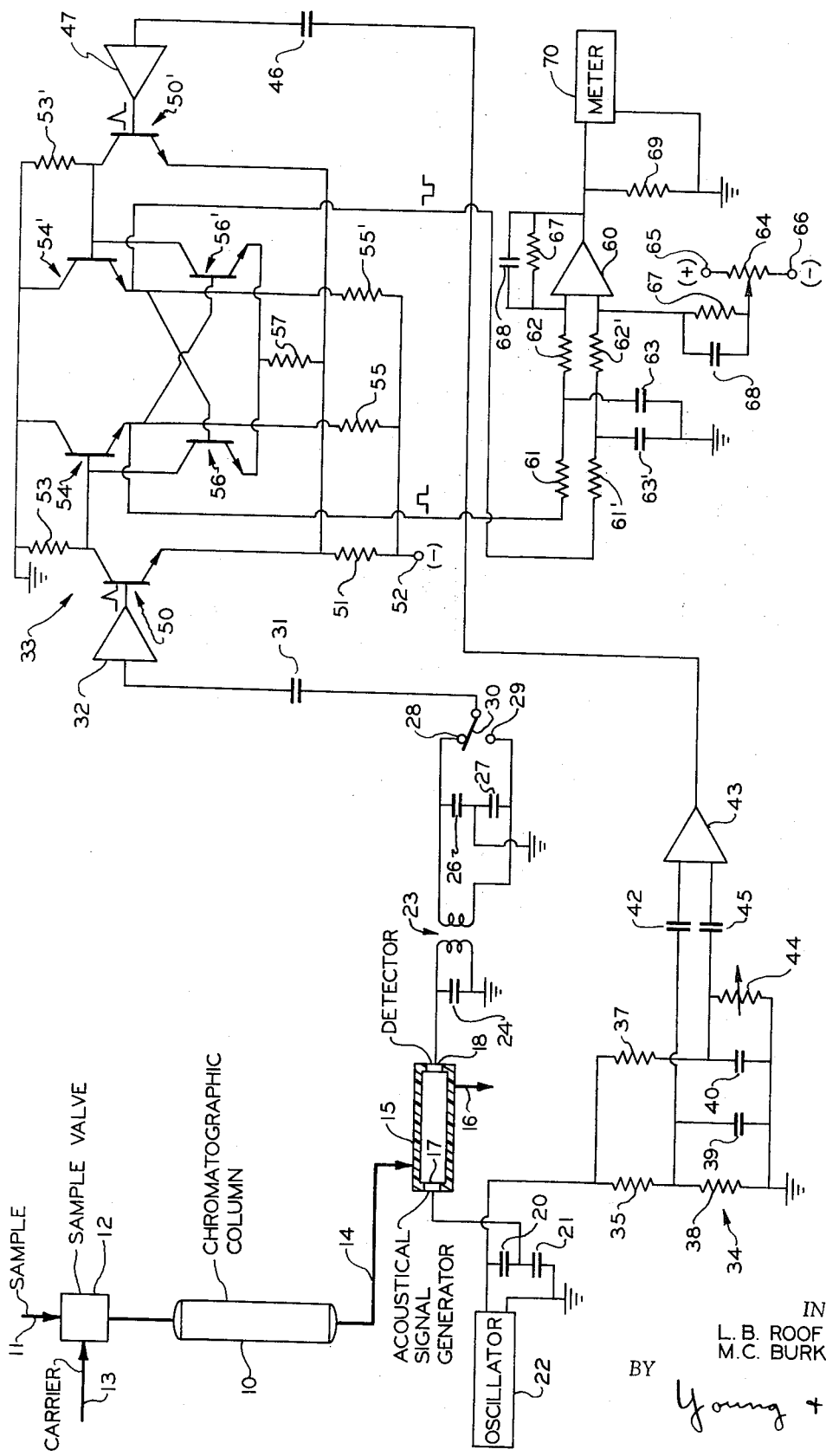

ACOUSTICAL DETECTING APPARATUS

Various types of chromatographic analyzers have been developed which are capable of analyzing fluid mixtures. In most of these analyzers, a sample of the fluid mixture is introduced into a stream of carrier gas which flows through the column. The constituents of the mixture appear in sequence in the column effluent which is passed to a suitable detecting device. It has recently been found that the use of a carrier liquid in place of the carrier gas can be employed to advantage in certain separations. However, a need exists for a detector which is capable of accurately measuring small changes in composition of liquid effluent streams from chromatographic columns.

An acoustical detector which is adapted for use with chromatographic analyzers is described in U.S. Pat. No. 3,468,157. The column effluent is passed through a chamber which has an acoustical generator at one end and a detector at the opposite end. The output signal from an oscillator is applied to the generator, and the detector measures the signal transmitted through the chamber. By comparing the oscillator signal with the detector signal it is possible to observe changes in composition of the fluid in the chamber. This is due to changes in the velocity of transmission of the acoustical signal through the chamber.

In accordance with the present invention, improved apparatus of the general type described in the foregoing patent is provided. A reference signal from the oscillator is passed through a phase adjustment network to one input of a flip-flop circuit. The output of the acoustical detector is passed to the second input of the flip-flop. The flip-flop circuit provides two output signals which are 180° out of phase with one another. By comparing these two signals, information is obtained which is representative of the velocity of transmission of the acoustical signal through a chamber containing the material to be analyzed, and thus of the composition of the material.

The accompanying drawing is a schematic representation of an embodiment of the apparatus of this invention.

Referring now to the drawing in detail, there is shown a chromatographic column 10 which is filled with a material that selectively retards passage of constituents of a mixture to be analyzed. A sample of this mixture is introduced through a conduit 11 which communicates with a sample valve 12. A carrier fluid, which can be either a liquid or a gas, is introduced through a conduit 13 which communicates with valve 12. The outlet of valve 12 is connected to the inlet of column 10. The effluent from column 10 is directed through a conduit 14 to the inlet of a chamber 15. After flowing through chamber 15, this effluent is vented through a conduit 16. An acoustical signal generator 17 is positioned in one end of chamber 15, and an acoustical detector 18 is positioned in the opposite end of the chamber. Acoustical signals thus pass through the chromatographic column effluent in chamber 15 to detector 18.

Valve 12 can be a rotary or diaphragm operated sample valve of the type well known in the art. The sample mixture initially passes through a sample loop in the valve to a vent. When it is desired to introduce a predetermined volume of the sample into column 10, the valve is actuated so that the carrier fluid forces the trapped sample into the column. The constituents of the sample mixture subsequently appear in sequence in the column effluent. The velocity of propagation of acoustical signals through chamber 15 varies as the composition of the column effluent changes. A measurement of the changes in the velocity of propagation thus provides information concerning changes in the composition of the column effluent.

First and second capacitors 20 and 21 are connected in series relationship across the output terminals of an oscillator 22. The junction between capacitors 20 and 21 is connected to acoustical signal generator 17. This generator is also provided with a common ground terminal, not shown. Generator 17 thus provides a series of acoustical pulses at the frequency of oscillator 22. In one specific embodiment of this invention employed as a liquid detector, the oscillator can have a frequency of approximately 4.44 megacycles per second. In this same embodiment, chamber 15 can have a length of about 10 millimeters. The first output terminal of detector 18 is connected to the first terminal of the primary winding of a transformer 23. The second terminal of detector 18, not shown, and the second terminal of the primary winding of transformer 23 are connected to ground. A capacitor 24 is connected across the primary winding of transformer 23. Capacitors 26 and 27 are connected in series relationship across the secondary winding of transformer 23, with the junction between these capacitors being connected to ground. The two end terminals of the secondary winding of transformer 23 are connectd to respective terminals 28 and 29 which are adapted to be engaged selectively by a switch 30. Switch 30 is connected by a capacitor 31 to the input of an amplifier 32. The output of amplifier 32 is connected to the set terminal of a flip-flop circuit 33.

An output signal from oscillator 22 is also applied through a phase adjustment network 34 to the reset terminal of flip-flpp circuit 33. The first output terminal of oscillator 22 is connected to the first terminals of resistors 35 and 37. The second terminals of these resistors are connected to ground by a resistor 38 and capacitor 39, an by capacitor 40, respectively. The second terminal of resistor 35 is connected by a capacitor 42 to the first input of a differential amplifier 43. A variable resistor 44 is connected in parallel with capacitor 40. The junction between resistor 37 and capacitor 40 is connected by a capacitor 45 to the second input terminal of differential amplifier 43. The output of amplifier 43 is connected by a capacitor 46 to the input of an amplifier 47. The output of amplifier 47 is connected to the reset terminal of flip-flop network 33.

The phase of the signal applied to amplifier 47 can be varied by adjusting resistor 44 in phase adjustment network 34. The phase of the output signal from detector 18 can be changed 180° by manipulation of switch 30. These two adjustments permit the relative phases of the two signals applied to flip-flop network 33 to be adjusted relative to one another by approximately 360°.

Flip-flop network 33 comprises a first transistor 50, the base of which is connected to the output of amplifier 32. The base of a second transistor 50' is connected to the output of amplifier 47. The emitters of transistors 50 and 50' are connected by a common resistor 51 to a negative potential terminal 52. The collectors of transistors 50 and 50' are connected by respective resistors 53 and 53' to ground. The collectors of transistors 50 ad 50' are connected to the bases of respective transistors 54 and 54'. The emitters of transistors 54 and 54' are connected to terminal 52 by respective resistors 55 and 55'. The collectors of transistors 54 and 54' are connected to ground. The bases of transistors 54 and 54' are connected to the collectors of respective transistors 56 and 56'. The emitters of transistors 56 and 56' are connected by a common resistor 57 to the emitters of transistors 50 and 50'. The emitter of transistor 54 is connected to the base of transistor 56', and the emitter of transistor 54' is connected in the base of transistor 56. The emitters of transistors 54 and 54' constitute the two outputs of the flip-flop circuit.

The input signals to the flip-flop circuit constitute relatively sharp pulses, as illustrated. The arrival of a pulse at the base of transistor 50 serves to "set" the flip-flop so as to increase the potential of negative polarity tt the emitter of the transistor 54. The later arrival of a pulse at the base of transistor 50' serves to "reset" the network so that there is a decrease in potential at the emitter of transistor 54. This results in a square wave output pulse, the duration of which is a function of the difference between the times of arrival of the two input pulses. A corresponding signal appears at the emitter of transistor 54' except that this signal is 180° out of phase with the signal at the emitter of transistor 54.

The output signals from flip-flop circuit 33 are applied through respective low pass filters to the input terminals of a differential amplifier 60. The emitter of transistor 54 is connected to amplifier 60 through resistors 61 and 62. The junction between these resistors is connected to ground by a capacitor 63. The emitter of transistor 54' is connected to the second input terminal of amplifier 60 through resistors 61' and 62'. The junction between these resistors is connected to ground by a capacitor 63'. A feedback resistor 67 and capacitor 68 are connected between the output of amplifier 60 and the inverting input of amplifier 60. Amplifier 60 is provided with a zero adjustment network which includes a potentiometer 64, the end terminals of which are connected to respective positive and negative potential terminals 65 and 66. The contactor of potentiometer 64 is connected to the second input terminal of amplifier 60 through parallel connected resistor 67'and capacitor 68'. The output of amplifier 60 is connected to ground across a resistor 69. A meter 70 is connected across resistor 69.

Differential amplifier 60 effectively adds the absolute values of the two series of input pulses from flip-flop circuit 33. The magnitude of the output signal applied to meter 70 is representative of the difference between the arrival times of the set and reset pulses at the two inputs of network 33. If the composition of fluid in chamber 15 varies, the velocity of transmission of the acoustical pulses changes. This changes the widths of the output pulses from network 33. Phase adjustment network 34 and switch 30 permit the apparatus to be adjusted initially to produce a signal of desired amplitude when a reference fluid is in chamber 15. Actually, the measurement of the D.C. value of a single series of output pulses from network 33 will provide an indication of changes in composition. The use of differential amplifier 60 merely increases the accuracy of the measurement.

While this invention has been described in conjunction with the analysis of the effluent stream from a chromatographic column employing a liquid carrier fluid, the invention is by no means limited thereto. Gaseous mixtures as well as liquid mixtures can be analyzed, although it may be desirable in such cases to change the frequency of oscillator 22 to compensate for differences in the velocity of transmission of the acoustical signals through gas. The detector of this invention can be employed to measure changes in compositions of fluids from various sources.

While this invention has been described in conjunction with a presently preferred embodiment, it obviously is not limited thereto.

What is claimed is:

1. Apparatus for detecting changes in composition of a fluid comprising:
   a chamber adapted to receive the fluid to be tested;
   an acoustical signal generator and an acoustical detector positioned in said chamber in spaced relationship with one another so that fluid in the chamber occupies the space between said generator and said detector;
   an oscillator;
   means connecting said oscillator to said signal generator to actuate same;
   a flip-flop circuit having first and second inputs and first and second outputs, said first and second outputs generating pulses of the same configuration but 180° out of phase with one another;
   means connecting said detector to said first input;
   a phase adjustment network;
   means connecting sad oscillator to said second input through said phase adjustment network; and
   means connected to said first and second outputs to measure the duration of output pulses from said flip-flop circuit, the duration of such pulses being representative of the difference between the arrival times of pulses at the two inputs of said flip-flop circuit, which difference is representative of the velocity of transmission of acoustical signals through the fluid in said chamber, said means to measure including means to measure the sum of the absolute values of the output pulses from the two outputs of said flip-flop circuit.

2. Apparatus for detecting changes in composition of a fluid comprising:
   a chamber adapted to receive the fluid to be tested;
   an acoustical signal generator and an acoustical detector positioned in said chamber in spaced relationship with one another so that fluid in the chamber occupies the space between said generator and said detector;
   an oscillator;
   means connecting said oscillator to said signal generator to actuate same;
   a flip-flop circuit having first and second inputs and an output;
   means connecting said detector to said first input;
   a phase adjustment network;
   means connecting said oscillator to said second input through said phase adjustment network; and
   means connected to said output to measure the duration of output pulses from said flip-flop circuit, the duration of such pulses being representative of the difference between the arrival times of pulses at the two inputs of said flip-flop circuit, which difference is representative of the velocity of transmission of acoustical signals through the fluid in said chamber, said means to measure comprising a low-pass filter to convert output pulses from said flip-flop circuit into a direct current signal, the amplitude of which is representative of the duration of the pulses, and means to measure the amplitude of said direct current signal.

3. Apparatus for detecting changes in composition of a fluid comprising:
- a chamber adapted to receive the fluid to be tested;
- an acoustical signal generator and an acoustical detector positioned in said chamber in spaced relationship with one another so that fluid in the chamber occupies the space between said generator and said detector;
- an oscillator;
- means connecting said oscillator to said signal generator to actuate same;
- a flip-flop circuit having first and second inputs and an output;
- means connecting said detector to said first input including means to reverse by 180° the phase of the signal applied to said input from said detector;
- a phase adjustment network;
- means connecting said oscillator to said second input through said phase adjustment network; and
- means connected to said output to measure the duration of output pulses from said flip-flop circuit, the duration of such pulses being representative of the difference between the arrival times of pulses at the two inputs of said flip-flop circuit, which difference is representative of the velocity of transmission of acoustical signals through the fluid in said chamber.

* * * * *